July 5, 1927.

M. MENZEL 1,634,753

MOLDING MACHINE

Filed Jan. 28, 1926

Inventor:
Martin Menzel
by Kuichaiter
Atty.

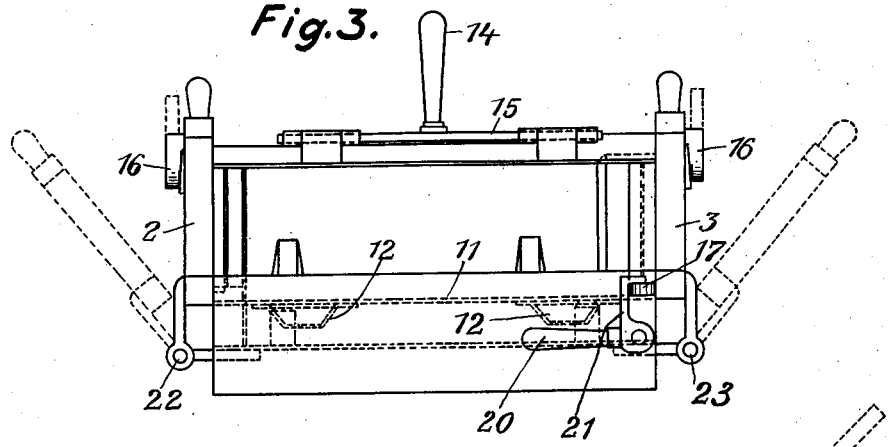
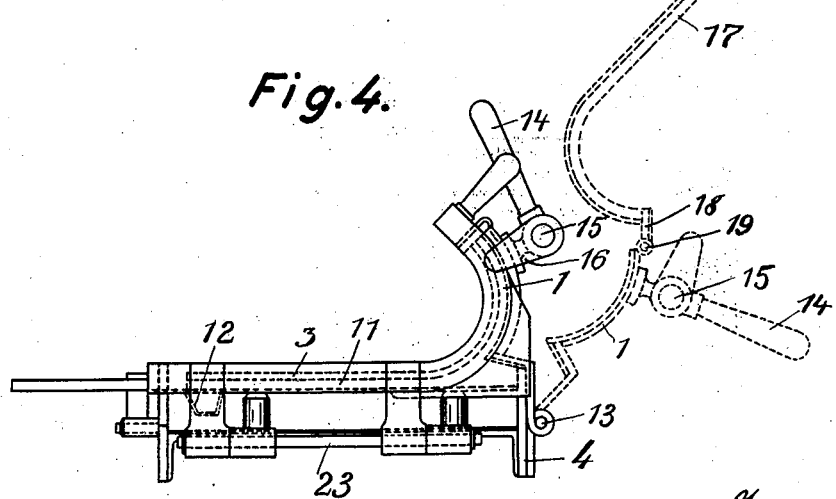

Patented July 5, 1927.

1,634,753

UNITED STATES PATENT OFFICE.

MARTIN MENZEL, OF RUHLAND, GERMANY.

MOLDING MACHINE.

Application filed January 28, 1926, Serial No. 84,351, and in Germany January 24, 1925.

My invention relates to a molding machine for manufacturing sections, for instance gutter-shaped roofing tiles and other curved sections from concrete or the like and it is an object of my invention to overcome the difficulties connected with the molding of such sections which generally comprise a comparatively long straight portion and a shorter curved portion.
In the manufacture of roofing tiles or the like from concrete it is necessary to remove the mold immediately after the molding operation has been finished in order to apply to the molded objects colouring, water-proofing or other agents. These agents cannot be applied after the concrete has set because they would not become properly incorporated in the concrete substance but come off after a short time.
If, when molding the tile, the straight portion of the mold is horizontal, it is extremely difficult if not impracticable to mold the curved portion as the concrete does not stick to the curved portion of the mold but persistently comes off. In order to overcome this difficulty, it has been proposed to so adjust the mold that the curved portion of the tile rests on the curved portion of the mold, and the straight portion of the mold is substantially vertical. In this case, however, the moulding of the straight portion is difficult as the concrete does not adhere to the substantially vertical portion of the mold. With these methods, it is not possible to remove a finished gutter tile or the like immediately after molding but such tile should remain on its support until it has set, that is, for about twenty-four hours, and consequently it is necessary to remove the support together with the tile in order to render the mold available for further use. The curved portion of the mold is hinged to the mold, as it must be turned back on its hinges to enable the said colouring and water-proofing agents to be applied. Such hinged parts are very expensive in manufacture and, moreover, molding by means of them takes much longer than with a normal support. Finally, the lateral portions of the mold become complicated due to the curved support so that difficulties arise in connection with the application of the colouring and water-proofing agents.

It is an object of my invention to provide a molding machine in which all the difficulties explained above are overcome so that it is possible to manufacture, for instance, gutters of concrete more cheaply than gutters of metal and practically without waste. Concrete gutters are preferable as their life is longer than that of metal gutters.

According to my invention, the mold is erected so that the straight portion of the tile is practically vertical and its curved portion is below said straight portion. Concrete is now charged into this curved portion and rammed, and then the mold is lowered so that its straight portion assumes a practically horizontal position. This straight portion of the mold is now also charged with concrete and rammed. Finally the mold is lowered into a completely horizontal position and opened, and the tile may now be removed before the concrete begins to set. By performing the molding operation as described, each part of the mold is rammed in the most favorable position and the finished tile may be handled at or near its centre of gravity, and taken from the mold, damage to the tile while removing it being absolutely prevented.

In the drawings affixed to this specification and forming part thereof, a molding machine embodying my invention is illustrated diagrammatically by way of example.

In the drawings,

Fig. 3 is an end elevation of the mold on a larger scale, and

Fig. 4 is a lateral elevation of said mold.

Figure 1:
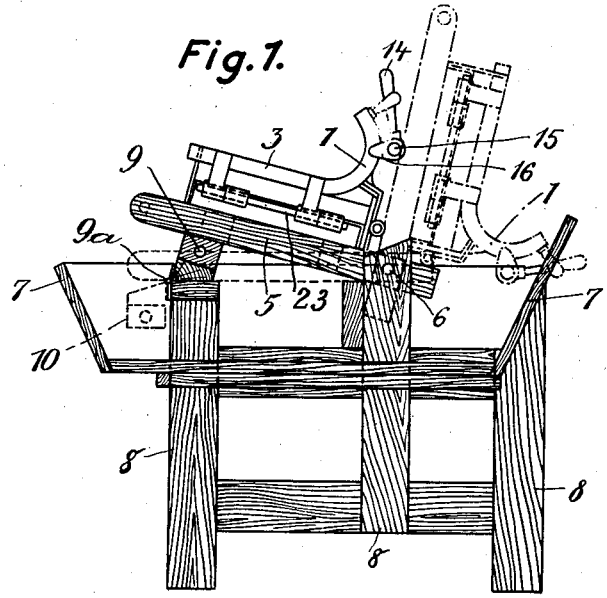
Fig. 1 is an elevation.
Figure 2:
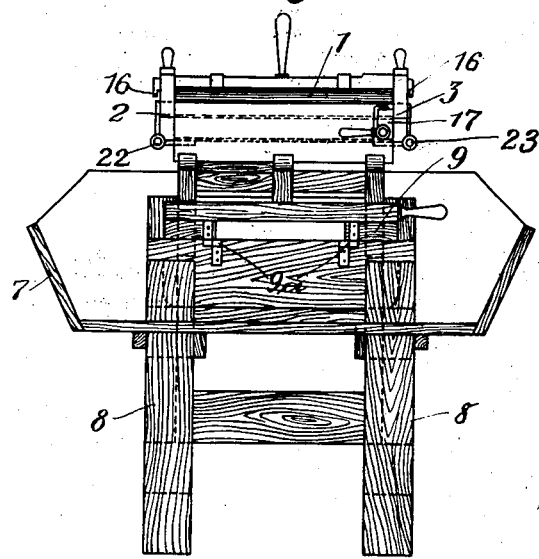
Fig. 2 is an end elevation of the molding machine.

Referring now to the drawings, 7 is the trough-shaped table of the molding machine which is secured to supports 8, and 5 is a base plate hinged to the central support 8 at 6 and carried on a block 9 which is hinged to the front support 8 at 9ª. In its normal position, the surface of the block on which the base plate 5 rests, is at an angle of about 10 degrees to the horizontal. The position of the block after having been turned down about its hinges 9ª is indicated in dotted lines at 10 in Fig. 1.

The mold proper is secured to the base plate 5 by a frame generally indicated at 4 in Fig. 4. Said frame supports a horizontal plate 11 which may be provided with depressions 12 to form nibs or the like on the tile. A curved plate 1 is attached to the horizontal plate 11, said curved plate being adapted to turn about a pivot 13 at the rear end of the frame 4. This plate molds the curved or gutter portion of the tile. The plate 1 and the parts connected to it are shown in dotted lines and in open position in Fig. 4. A handle 14 is pivoted to the curved plate 1, said handle being secured on a pin 15 to which lugs 16 are secured at both ends for holding the side walls 2 and 3 of the mold in position, as shown in full lines in Fig. 3. A narrow strip 17 is secured to a narrow plate 18 which is hinged to the curved rear portion 1 of the mold at 19. The strip 17 is shaped in conformity with the plates 11 and 1. The width of the plate 18 corresponds to the thickness of the tile to be molded. The narrow strip 17 is at some distance from the base plate 11 and so it provides a narrow interstice which reduces the thickness of the tile along its edge. When the mold is closed and the curved plate 1 is in its normal position as shown in full lines in Fig. 4, in which position a tile may be molded, the narrow strip 17 is lowered and secured in this position by a latch 21 with a handle 20.

The side walls 2 and 3 are adapted to be turned down about pivots 22 and 23 in the frame 4, as shown in dotted lines in Fig. 3. In operative position, these side walls are held by the lugs 16 on the shaft 15 which preferably engage inclined faces on the side walls, as shown in full lines in the same figure.

As the parts of the mold, viz, the curved rear plate 1, the two lateral walls 2 and 3, the strip 17 and the narrow plate 18 are pivotally carried, it is possible to open the mold and to lay open completely the molded tile which is then only supported by the plate 11 from which it may be removed.

The molding operation is performed as follows:

The base plate 5 with the mold is turned on its hinge 6 into the substantially vertical position shown in dot-and-dash lines in Fig. 1. The curved portion of the mold is now charged with concrete and the concrete is rammed from the rear end of the mold. After the curved portion has been completed, the plate 5 is turned into the substantially horizontal position shown in full lines in Fig. 1 and its horizontal portion is charged with concrete which is rammed from the front end of the mold and finished at this end by a strickle board moved past the front edges of the side walls 2 and 3. During this operation, the curved portion of the tile is supported by the plates 1 and 18 so that it is not damaged by the ramming operation performed on the horizontal portion.

After the molding operation has been finished by molding the horizontal and curved portions of the tile, a colouring or waterproofing or other agent is applied to its exposed faces, this being effected by means of an ordinary or an air brush. The said agent or agents is, or are, applied to all those faces of the tile which are visible or exposed to atmospheric influences. The lower face of the tile does not require colouring, as it is not visible when the tile has been laid.

When the tile has been completely finished, it may be removed by holding it with the fingers at its edges at about the centre of gravity and conveyed to a station where the concrete is allowed to set.

All the parts of the machine are readily and rapidly handled and its output is considerable.

I wish it to be understood that I do not desire to be limited to the exact details of construction shown and described for obvious modifications will occur to a person skilled in the art.

I claim:

1. Molding machine for manufacturing partly curved concrete sections comprising a frame, a mold having a straight and a curved portion, and means for so adjusting said mold with regard to said frame that in one of its positions said straight portion is substantially vertical and said curved portion is below said straight portion and in another position said straight portion is substantially horizontal and said curved portion is above it.

2. Molding machine comprising a frame, a base plate pivotally carried on said frame, a mold secured to said base plate, a fixed check on said frame adapted to hold said base plate in a substantially vertical position, and a detachable check hinged to said frame and adapted to hold said base plate in a substantially horizontal position.

In testimony whereof I affix my signature.

MARTIN MENZEL.